United States Patent [19]

Morisue

[11] 4,168,438

[45] Sep. 18, 1979

[54] LIGHT SCATTERING TYPE SMOKE DETECTOR

[75] Inventor: Kazushige Morisue, Owariasahi, Japan

[73] Assignee: Matsushita Electric Works, Ltd., Osaka, Japan

[21] Appl. No.: 892,915

[22] Filed: Apr. 3, 1978

[30] Foreign Application Priority Data

May 4, 1977 [JP] Japan .................................. 52-39110

[51] Int. Cl.² .............................................. G01N 21/00

[52] U.S. Cl. ...................................... 250/574; 356/438

[58] Field of Search ................ 250/574, 575; 340/630; 356/438

[56] References Cited

U.S. PATENT DOCUMENTS 4,124,298 11/1978 Steele .............................. 250/574 X

*Primary Examiner*—David C. Nelms

*Assistant Examiner*—Darwin R. Hostetter

*Attorney, Agent, or Firm*—Burns, Doane, Swecker & Mathis

[57] ABSTRACT

A light scattering type smoke detector having an improved labyrinth high in shielding effects for interior detecting means from the exterior light and other obstacles such as dusts, insects or the like than smoke particles is provided. The labyrinth comprises a plurality of outer peripheral shielding elements spaced from one another defining peripheral apertures therebetween, a plurality of inner shielding elements spaced from the outer elements and from one another defining therebetween inner apertures, said inner shielding elements opposing respectively to each peripheral aperture and said inner apertures to each outer shielding element, and a filtering means made of thin plate material perforated to have many small holes and disposed behind the respective outer elements to close the inner apertures while allowing substantially the smoke particles only to pass therethrough. In an aspect, the inner shielding elements and filtering means comprise an integral strip-shaped plate substantially of ring shape perforated at spaced sections providing therebetween non-perforated shielding sections, and the respective outer shielding elements have an inward extended wall to guide incoming smoke toward the filtering perforated sections.

10 Claims, 11 Drawing Figures

Fig. 5A
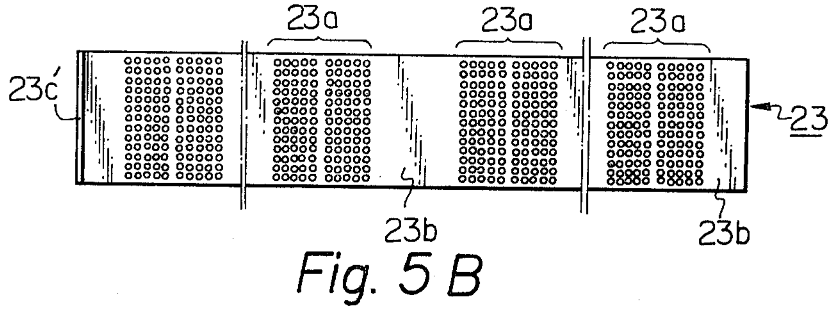
Fig. 5 B
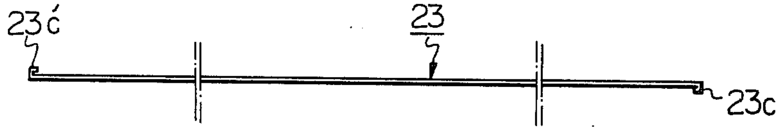
Fig. 9
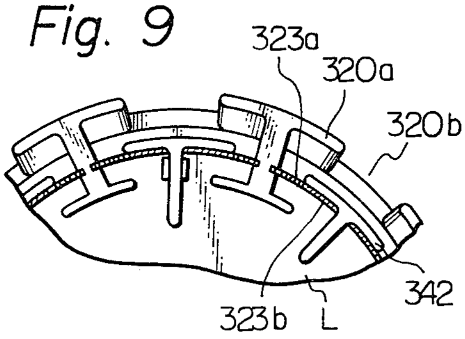
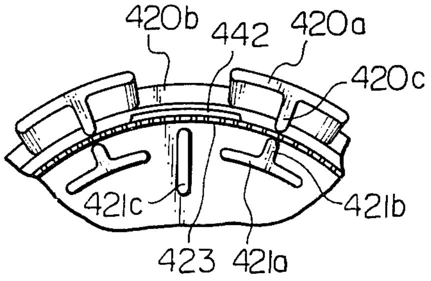
Fig. 10

LIGHT SCATTERING TYPE SMOKE DETECTOR

This invention relates to light scattering type smoke detectors and, more particularly, to improvements in the detectors in which the light scattered by smoke particles is electrically detected to alarm disaster occurrence.

In the light scattering type smoke detector, it is necessary to shield at least a light receiving element of optical system in the detector from exterior light so that the element will be responsive only to the scattered light of a light emitting element due to smoke while allowing smoke to enter the detector and, for this purpose, there is provided a "labyrinth" in housing member of the detector. In order to prevent the light receiving element from responding to any disturbing factor such as dust, insects or the like other than the smoke particles, further, it has been suggested to cover the labyrinth with a screen or net of relatively small mesh so as not to allow the dust, insects or the like to enter the interior of the detector through the labyrinth.

Referring to a structure of a typical conventional detector of the kind referred to with reference to FIGS. 1 and 2, a housing of the detector substantially comprises a lid member 1 including a labyrinth means for covering respective components of the optical system, light emission controlling system and responsive signal processing system, and a base member 11 for securing the respective components as well as the lid member 1 thereto and mounting the entire device to a ceiling C. In the lid member 1 substantially of a cup shape, there are provided an outer peripheral wall 2 of a relatively small height and an inner wall 3 of a relatively large height as spaced from the outer wall 2 defining a groove 4 therebetween, and the inner wall 3 has a plurality of cut-outs 4' at the upper edge. In the present instance, the lid member 1 has a bottom aperture 5, which is covered with a covering plate 7 having a plurality of small holes 6 and a further inner covering plate 9 spaced from the plate 7 and having a single small hole 8 not aligned with any of the holes 6 in the plate 7 so that the holes in the respective spaced plates 7 and 9 will define a bottom labyrinth allowing smoke to enter the interior from the bottom of the detector. The outer and inner peripheral walls 2 and 3 as well as the cut-outs 4' will form a peripheral labyrinth in cooperation with the base member 11 as will be described in the following and, in this peripheral labyrinth, a net 10 woven with wires as shown in FIG. 2 and having substantially the same height as the inner wall 3 is employed as inserted in the groove 4.

The base member 11 is also provided with an outer peripheral wall 12 and inner wall 13 spaced from the wall 12 to define between them a space 14 which is enough, when the lid member 1 is secured to the base member 11 to position the top edges of the inner wall 3 and net 10 in the space 14, for leaving clearances on both outer and inner sides of the wall 3, and the outer peripheral wall 12 has a relatively small height adapted to provide a peripheral aperture 15 between the top edge of the outer peripheral wall 2 of the lid member 1 and the bottom edge of the outer peripheral wall 12 of the base member 11, so that the aperture 15, cut-outs 4' and both side clearances of the wall 3 will form the peripheral labyrinth allowing any smoke mostly flowing along the ceiling C to enter the interior of the detector through this labyrinth while any dusts, insects or the like are prevented from entering the interior by means of the net 10. Thus, the interior of the detector is made to be a dark room 16, in which an optical system comprising a light emitting element 17a and light receiving element 17b is disposed, the respective elements of which are secured to a base plate having the peripheral outer and inner walls 12 and 13 at relative positions where emitted light from the emitting element 17a is not directly incident on the receiving element 17b but is incident thereon when scattered by the smoke particles present in front of the light emitting element 17a. A light emission controlling system connected to the light emitting element 17a and responsive signal processing system connected to the light receiving element 17b are disposed, in the present instance, in the dark room 16 and respectively on each side of the optical system, while not shown. The base member 11 is provided also with a pair of mounting hooks 18 on the opposite side to the dark room 16, which are made of an electrically conductive metal and are connected to the controlling and processing systems. A mounting base member 19 having a pair of electric power supply terminals is secured to the ceiling C and an integral block of the lid member 1 and base member 11 with the respective components referred to is mounted to the base member 19 by clampingly hanging the respective hooks 18 to each of the terminals of the member 19.

With the above arrangement, the net 10 interposed in the peripheral labyrinth acts to prevent the external disturbing factors such as dusts, insects or the like to enter the interior of the detector so that the light receiving element 17b will not misoperate due to such factors but, on the other hand, ventilating performance of the labyrinth to be retained for free flowing of smoke is inherently lowered by the net 10 so as to cause responsive characteristics of the detector to smoke to be deteriorated. In order to compensate for such deterioration of the characteristics, there have been taken such measures that performances of the processing system of the responsive signal from the light receiving element is raised so as to render the detector to be responsive to a lesser amount of smoke, the ventilating performance of the labyrinth is attempted to be improved by increasing opening rate of the peripheral wall, the mesh of the net is selected to be of the possible maximum value. However, the first referred measure will primarily cause manufacturing costs of the detector increased, the second measure requires a rather complicated structure of the labyrinth for maintaining the shielding effect with respect to the exterior light, and so on. Above all, the use of the wire-woven net involves such defects that a material net must be cut into required size for fitting in the groove or clearance reserved in the labyrinth generally manually along the length of respective wires since any automatic cutting machines are apt to cut the material diagonally with respect to the wires as shown by a chain line 10' in FIG. 2, which will result in a higher manufacturing cost and still a possible fray out of the woven wires at the diagonally cut edges, in addition to that the wire-woven net material often involves such uneven mesh part as shown by a reference 10'' also in FIG. 2, so that the detector employing the wire-woven net in the labyrinth will not be provided with a stable and reliable performance preventing any misoperation due to the external disturbing factors. The present invention has been suggested in view of these defects of the conventional smoke detectors of the kind referred to and to improve the detectors in such respects.

A primary object of the present invention is, therefore, to provide a light scattering type smoke detector which is high in both of the sensitivity to smoke and S/N ratio.

Another object of the present invention is to provide a light scattering type smoke detector which can be produced at a lower manufacturing cost.

A further related object of the present invention is to provide a light scattering type smoke detector which can keep the high sensitivity for a long time.

Other objects and advantages of the present invention shall be made clear upon reading the following explanation of the invention detailed with reference to certain preferred embodiments shown in accompanying drawings, in which:

FIGS. 5A and 5B are an elevation and an edgewise side view of a perforated plate member employed in the embodiment of FIG. 3 for filtering the dusts, insects of the like;

FIG. 9 is a fragmentary plan view of a lid member in a still another embodiment of the present invention; and FIG. 10 is a similar plan view showing a still further embodiment of the present invention.

Figure 1:
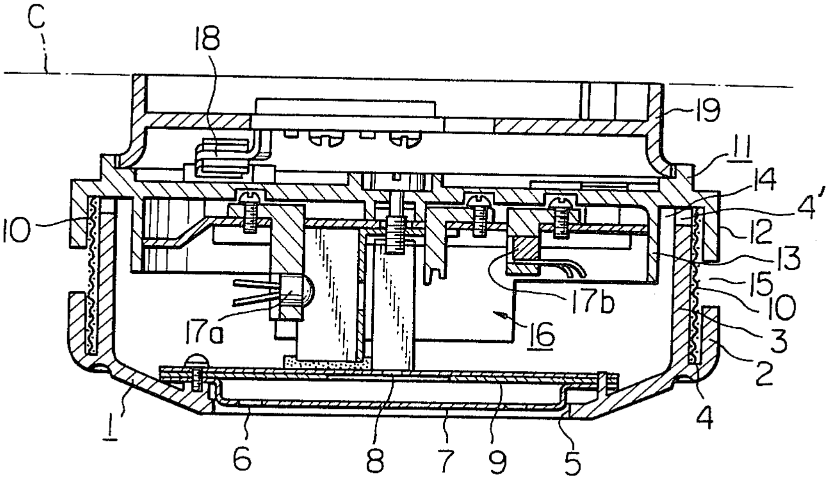
FIG. 1 is a vertically sectioned view of a conventional light scattering type smoke detector.
Figure 2:
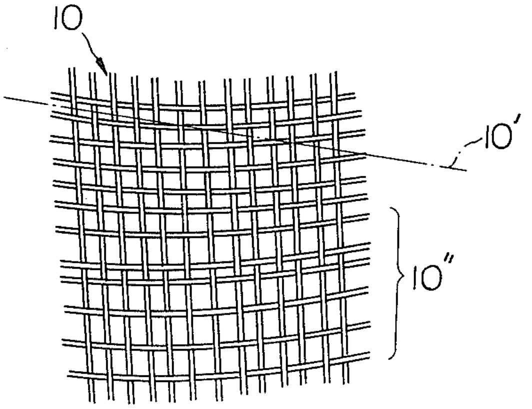
FIG. 2 is a fragmental plan view as magnified of a wire-woven net used in the detector of FIG. 1 for filtering dusts, insects or the like which disturbing accurate and reliable sensitivity of the detector to smoke.

Referring to the most preferable embodiment of the present invention with reference to FIGS. 3 to 6, a lid member L of the light scattering type smoke detector has a peripheral wall comprising a group 20 of outer wall elements, a group 21 of inner wall elements and a filtering perforated plate member 23 interposed between the respective groups 20 and 21, which are respectively errected from a substantially disk-shaped plate body for defining a dark room 22 inside the peripheral wall, and the outer and inner wall elements 20 and 21 and filtering plate member 23 are forming a labyrinth for allowing any smoke to pass therethrough into the dark room 22 but preventing any external disturbing factors such as environmental light, dusts, insects and the like from entering the dark room.

Figure 4:
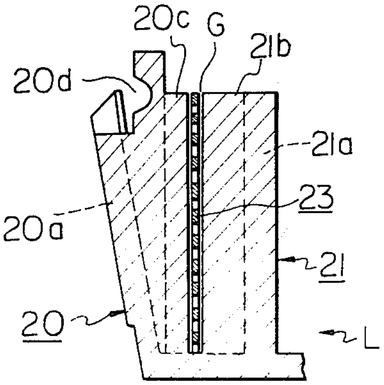
FIG. 4 is a fragmentary sectioned view along line IV—IV in FIG. 3 of the lid member.

The outer wall group 20 comprises a plurality of divided wall elements 20*a* errected at the peripheral edge of the disk-shaped body to be slightly diagonally expanded outward, and a plurality of peripheral apertures 20*b* are provided alternately between the respective wall elements 20*a*. Inside the respective wall elements 20*a*, there is formed an inward extended wall 20*c* so as to be vertical at inward edge with respect to the disk-shaped body, as seen in FIG. 4 and, on the top edge of some of the wall elements 20*a* diameterally opposing to each other, an engaging hook 20*d* as also shown in FIG. 4 is formed for securing the lid member L to a later described main body 30 of the detector.

The inner wall group 21 comprises a plurality of divided wall elements 21*a* errected substantially vertically on the disk-shaped body along a concentric circle with the outer wall elements 20*a* so as to oppose each other and respectively having an outward extended wall 21*b* opposing the inward extended wall 20*c* and a plurality of radially extending walls 21*c* respectively interposed in each of inner apertures provided between the respective divided wall elements 21*a* so as to dispose their outer edge at corresponding positions to those of outward end edges of the extended wall 21*b* with respect to the center of the disk-shaped body. The outward end edges of the extended walls 21*b* are opposing the inward end edges of the outer wall elements 20*a* so as to define a gap G between them as seen in FIG. 4.

Figure 3:
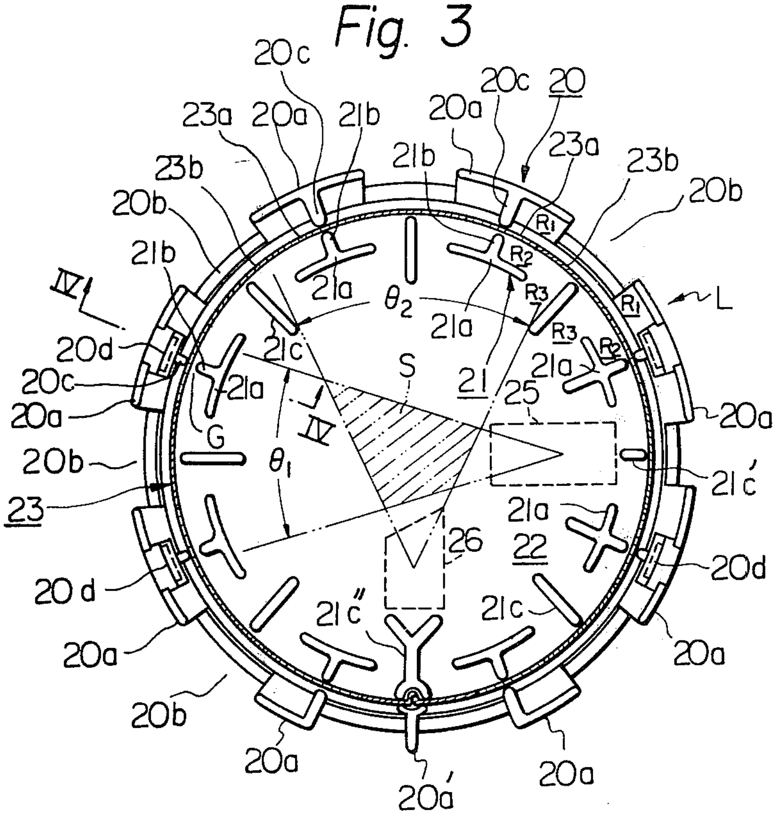
FIG. 3 is a plan view of a lid member of a light scattering type smoke detector shown as a most preferable embodiment of the present invention.

The filtering perforated plate member 23 is interposed between the respective outer wall elements 20*a* and the respective inner wall elements 21*a* as inserted in the gap G and the radially extending walls 21*c* abut the inner surface of the plate member 23 at its positions intermediate between the respective opposing sets of the wall elements 20*a* and 21*a*, as seen in FIG. 3. In the present instance, the plate member 23 is made of a strip-shaped thin plate of a proper metal or synthetic resin material, which is provided with a plurality of perforated sections 23*a* by means of a punching or etching process and with a plurality of non-perforated sections 23*b*, as shown in FIG. 5A, both sections of which are positioned alternately at regular repetitions so that the perforated sections 23*a* will be disposed between the respective opposing sets of the outer wall elements 20*a* and inner wall elements 21*a* while the non-perforated sections 23*b* will oppose the respective peripheral apertures 20*b*. Both longitudinal ends of the plate member 23 are formed to be hooking edges 23*c* and 23*c'* as shown in FIG. 5B, which are engaged to each other so that the strip-shaped plate member 23 will be retained in a ring shaped and disposed in the position between the outer wall elements 20 and the inner wall elements 21. In this position, the engaged hooking edges 23*c* and 23*c'* are held by forked end edges of radially extended walls of outer and inner elements 20*a'* and 21*c''* opposing each other.

While the plate member 23 is shown to have the hooking edges 23*c* and 23*c'* in the present embodiment which are made over the length of the respective longitudinal ends, it may be possible to provide a hooking means only at the center of the respective edges, or to join the both ends together by means of fusing, bonding, riveting or the like.

With the above arrangement of the filtering plate member 23 between the outer wall group 20 and the inner wall group 21, as shown in FIG. 3, the labyrinth which shields the exterior light but allows any smoke due to a disaster to pass therethrough is formed by a first smoke path $R_1$ defined by the outer wall element 20*a*, its inward extended wall 20*c* and perforated section 23*a* and communicated with the exterior through the peripheral aperture 20*b*, second smoke path $R_2$ defined by the outward extended wall 21*b* and inner wall element 21*a* and communicated with the first smoke path $R_1$ through the perforated section 23*a* and third smoke path $R_3$ defined by the non-perforated section 23*b* of the plate member 23 and radially extending wall 21*c* and communicated with the second smoke path $R_2$ and dark room 22 so that smoke coming from the peripheral apertures 20*b* through the first and second smoke paths $R_1$ and $R_2$ to the third smoke paths $R_3$ will be led into the dark room 22.

Figure 6:
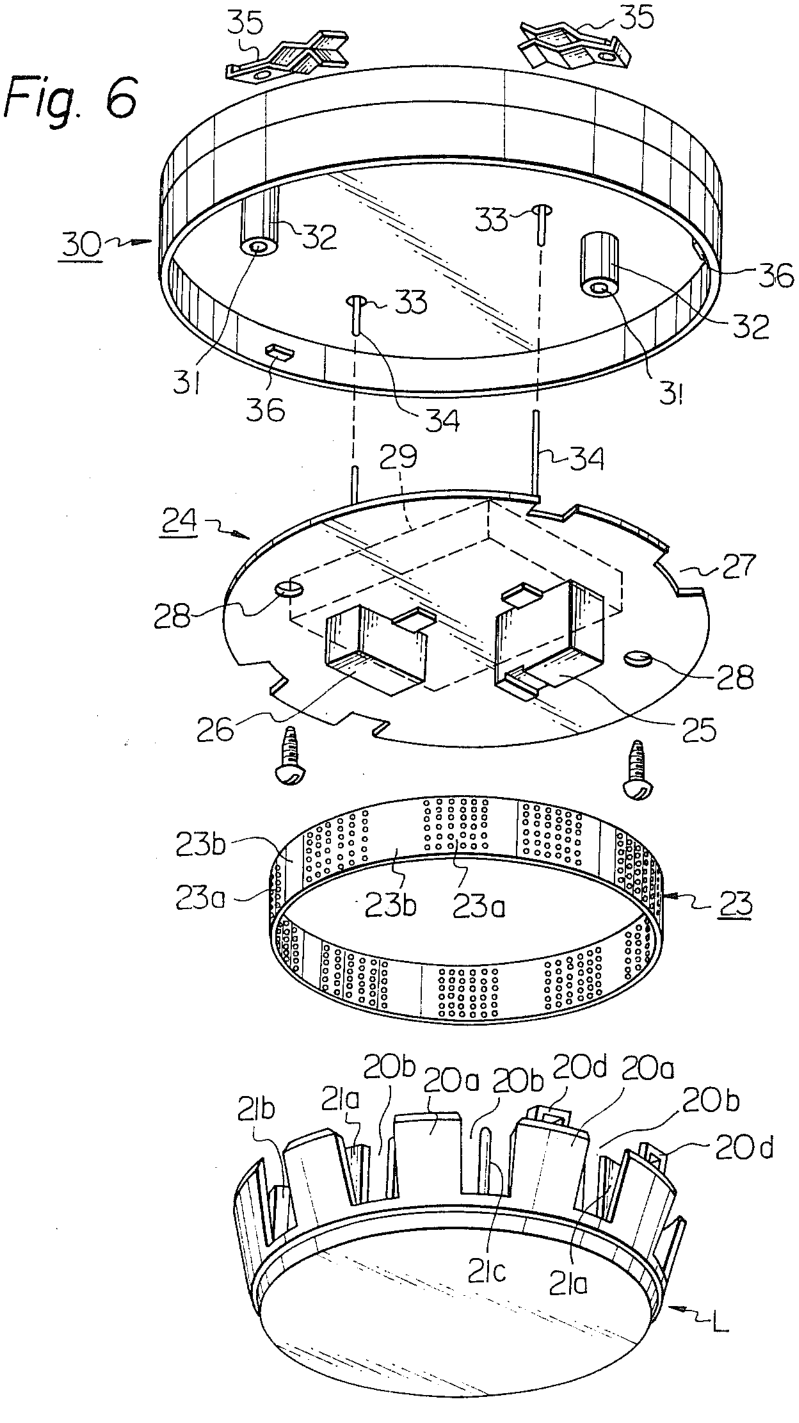
FIG. 6 is a perspective view as disassembled of respective components of the detector employing the lid member shown in FIG. 3.

The thus formed lid member L is opened above the dark room 22 and a substantially disk-shaped cover plate 24 shown in FIG. 6 is to cover the dark room 22. Conveniently, the cover plate 24 is secured to a base member 30 together with a light emission block 25 including a light emitting element, a light reception block 26 including a light receiving element and an electric circuit block 29 by means of screws passed through holes 28 and screwed into securing holes 31 made in bosses 32 of the base member 30. In the secured position of the cover plate 24 to the base member 30, peripheral cuts 27 of the plate 24 expose engaging projections 36 made in the base member 30 so as to be accessible through the plate 24. The light emission and reception blocks 25 and 26 are secured to the cover plate 24 on its side facing the dark room 22 of the lid member L in such positional relationship to one another that, as shown in FIG. 3 by dotted and chain lines, the reception block 26 is out of a range of irradiated light from the emission block 25 defined by an irradiation angle $\theta_1$ and the both blocks 25 and 26 are out of a sensing area S of overlapping regions of the irradiated light range and a light receiving range of the reception block 26 defined by a reception angle $\theta_2$. The electric circuit block 29 is secured on the other side of the plate 24 and comprises a light emission controlling circuit for the light emission block 25 and a detected signal processing circuit including means for amplifying a light-to-electricity converted signal from the light reception block 26, means for detecting levels of the amplified signal, and means for providing an output depending on the detected level and the like. The base member 30 has through holes for passing lead wires 34 of the circuit block 29 disposed in a space of the member 30, and the wires 34 are connected to mounting hooks 35 of electrically conductive material secured on the member 30 for mounting the assembled detector block to a mounting base (not shown) secured to the ceiling C and having terminals for receiving supplied electric power and presenting output signals of the detector to other alarming device or the like.

In assembling the detector block, the cover plate 24 with the light emission and reception blocks 25 and 26 and electric circuit block 29 is mounted to the base member 30, and the lid member L with the filtering plate member 23 is then secured to the base member 30 by engaging the engaging hooks 20*d* of the outer wall elements to the engaging projections 36 through the cover plate 24. The relative positions of the light emission and reception blocks 25 and 26 on the cover plate 24 to the labyrinth arrangement on the lid member L are determined by positionings of the engaging hooks 20*d* and projections 36. The manner in which the detector block is installed on the ceiling may be properly selected as required. For example, in place of the base member 30 and mounting base, a proper framing can be adopted to mount the detector block to ordinary terminal box on the ceiling or the block may be directly secured to the box by means of screws.

Referring now to the operation of the labyrinth in the above described embodiment according to the present invention, smoke due to an occurrence of fire approaches the detector along the ceiling C specifically at the peripheral apertures 20*b* which are directly open to the exterior as having no screen or net of coventional type, and the smoke will hit the non-perforated sections 23*b* and will be thereby led to both sideward directions and into the first smoke paths $R_1$. The smoke thus directed into the paths $R_1$ will be guided by the inward extended walls 20*c* into the second paths $R_2$ through the perforated sections 23*a* and similarly further into the dark room 22 through the third paths $R_3$. As the smoke thus led into the dark room 22 reaches the sensing area S, the light emitted from the emission block 25 and scattered by the smoke particles in the area S will be sensed by the light reception block 26 to be thereby converted into an electric signal, which is processed by the electric circuit block 29 and presented to the alarming device or the like as an output of the detector.

In the event when any dusts, insects or the like come through the peripheral apertures 20*b*, they will be initially caused to collide with the non-perforated sections 23*b* of the filtering member 23 to be thereby prevented from causing the perforated sections 23*a* clogged. The one still entered the first smoke path $R_1$ is caused to collide with the inward extended wall 20*c* and prevented from entering the further paths by means of the perforated sections 23*a* of the filtering member 23 and eventually none of such disturbing factors as dusts, insects or the like is allowed to enter the interior.

The peripheral outer wall elements 20*a* and non-perforated sections 23*b* primarily shield the interior dark room 22 from the exterior light. Any light directed to the first smoke paths $R_1$ as reflected on the non-perforated sections 23*b* is attenuated by the sections 23*b* already and even directly incidental light on the perforated sections 23*a* will be attenuated by the perforated sections 23*a*. Reflected light on the inner surface of the outer wall element 20*a* to be directed inward through the perforated sections 23*a* will be further attenuated by the section 23*a*, outward extending wall 21*b*, inner wall elements 21*a*, inside surface of the non-perforated section 23*b* and radially extending wall 21*c*, so as to be of a much less value than that will cause the light reception block 26 to be actuated. For this purpose, it is preferable to make all the components of the labyrinth as well as the inner surface of the lid member and light emission and reception blocks in black color.

Since the filtering plate member 23 properly perforated to have many small holes of a size allowing substantially only the smoke particles is employed in the present invention, it is enabled to prepare the filtering member which is reliable, inexpensive and still high and uniform in the filtering effect, involving none of such detects as in the case of conventional wire-woven screen or net. In the case of the present embodiment, specifically, the filtering member 23 includes the non-perforated sections which can be utilized as inner peripheral wall elements exposed to the exterior through the peripheral apertures, whereby dimensions of the total smoke path in the labyrinth can be made large and thus the ventilating performance of the labyrinth can be improved for better allowance of smoke entry to achieve a higher sensitivity to smoke while achieving a higher S/N ratio due to the reliable filtering performance of the perforated plate member.

Figure 7:
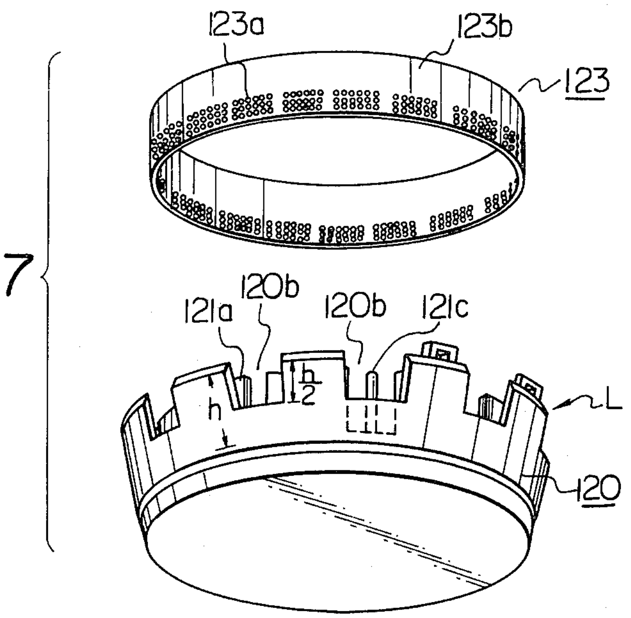
FIG. 7 is a perspective view as disassembled of a lid member and filtering plate member in another embodiment of the present invention.

Referring next to a second embodiment shown in FIG. 7, a filtering plate member 123 is made to have a perforated section 123*a* and non-perforated section 123*b* separately in the width direction of the plate-shaped material so that the respective sections will continue in one half side along the length of the material. In this case, an outer peripheral wall 120 of the lid member L is formed to have a plurality of peripheral apertures 120*b* respectively of a smaller height such that, for example, when the height of the peripheral wall 120 is "h", the height or depth of the aperture will be h/2. Thus, when the filtering member 123 is assembled in the labyrinth of the lid member, the perforated section 123*a* is disposed to oppose a foot part of the peripheral wall 120 which is continuously closed over the entire periphery while the non-perforated section 123*b* is exposed to the exterior through the peripheral apertures 120*b*. Respective upward extended parts of the peripheral wall 120 defining the respective apertures 120*b* and having the height of "h" are preferably provided with an inward extended wall in the same manner as in the case of the first embodiment so that smoke entered the space between the extended parts of the peripheral wall 120 and the non-perforated section 123*b* of the filtering member 123 will be directed toward the perforated section 123*a* so as to be promoted to pass therethrough. Respective inner wall elements 121*a* and 121*c* are provided in the same manner as those in the first embodiment but, instead of their arrangement as shown which corresponds to that of FIG. 3, it is rather preferable to arrange the concentric inner wall elements 121*a* at positions facing the peripheral apertures 120*b* and the radially extending walls 121*c* at positions facing the inward extended walls of the upward extended parts of the peripheral wall 120. In this case, the inner wall elements 121*a* may be of a height corresponding to the width of the perforated section 123*a* of the filtering element 123, since the rest upper part of the interior is shielded by the non-perforated section 123*b*. In the present instance, further, the perforated section 123*a* of the filtering member 123 can be formed to be divided into a plurality of sections as specifically shown in FIG. 7. In either case of the filtering member 123, the concentric inner wall elements 121*a* can be formed in an integral ring shape of a height corresponding to the width of the perforated section 123*a* of the filtering member 123.

Figure 8:
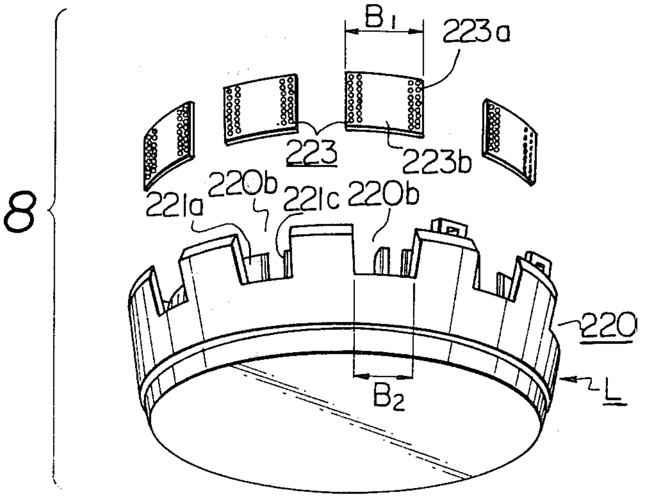
FIG. 8 is a similar perspective view showing a further embodiment of the present invention.

In FIG. 8, there is shown a third embodiment of the present invention, in which an outer peripheral wall 220 of the lid member L is formed in the same manner as in the case of FIG. 7 and a plate shaped filtering means 223 is formed in a plurality of divided members respectively having a length $B_1$ which is larger than a peripheral length $B_2$ of respective peripheral apertures 220*b* of the peripheral wall 220. A perforated section 223*a* is provided along each lengthwise edge of the respective divided members so that remaining middle part of the respective divided members will be a non-perforated section 223*b*. An inward extended wall is also provided inside the respective upward extended parts of the peripheral wall 220 defining the respective apertures 220*b* and each of the divided filtering members is inserted between the adjacent ones of the inward extended walls to dispose the perforated sections 223*a* behind the upward extended parts and the non-perforated sections 223*b* inside the peripheral apertures 220*b*. In the present instance, it is preferable to arrange respective inner wall elements in the same manner as in the case of FIG. 3. The outer peripheral wall 220 may be formed also in the same manner as that of FIG. 3 instead of the one illustrated in FIG. 8.

In the case of a further embodiment shown in FIG. 9, the lid member L is formed to have a plurality of inner wall elements 342, each of which is disposed to oppose respective peripheral apertures 320*b* of the outer peripheral wall defined by a plurality of outer wall elements 320*a* formed substantially in the same manner as in the case of FIG. 3 or 6, and the filtering plate member is formed in a plurality of divided members respectively having a perforated section 323*a* and non-perforated section 323*b* respectively made in one lengthwise half area of each member. The inward extended walls of the respective outer wall elements 320*a* are formed preferably integrally with respective further inner wall elements corresponding to the inner wall elements 21*a* having the outward extended wall 21*b* of FIG. 3, and the divided filtering plate members are held by radially extended parts of such integrally formed outer and inner wall elements so as to dispose the perforated sections 323*a* in each clearance between the radially extended part of the element 323*a* and the inner wall element 342 and the non-perforated section 323*b* behind the inner wall element 342. In this case, it may be possible to omit the non-perforated section 323*b* of the filtering member since the inner wall element 342 shields the interior from the exterior light incoming through the peripheral apertures 320*b*.

Referring finally to a still further embodiment of the present invention of FIG. 10, an intermediate inner wall element 442 is provided in the lid member L so as to also oppose each peripheral aperture 420*b* between adjacent ones of outer wall elements 420*a* having respectively an inward extended wall 420*c* of the peripheral wall. Respective inner wall elements 421*a* each having an outward extended wall 421*b* and radially extending walls 421*c* are provided substantially in the same manner as in FIG. 3, and a plate-shaped filtering member 423 having small filtering holes perforated over the entire length of the member is disposed between the respective opposing outer and inner wall elements 420*a* and 421*a* as held by their opposing inward and outward extended walls 420*c* and 421*b* so as to extend along the inner surface of the intermediate inner wall elements 442 which shield the interior of the detector from the exterior light.

While the filtering plate member employed in the present invention has been described in the foregoing, specifically with reference to the first embodiment of FIGS. 3 to 6, as being formed of a strip shape material both lengthwise ends of which are engaged to each other to be a ring shape, it should be appreciated that the member may be made from an already ring shaped material, for uses in the respective embodiments of FIGS. 3 to 6, FIG. 7 and FIG. 10. In the case of the filtering members in the divided form as in the cases of FIG. 8 and FIG. 9, it is also possible to prepare the divided elements from a continuous strip-shaped material or even a ring-shaped material which is preliminary subjected to the perforating process and cut into the respective divided members.

According to the present invention, as has been described in the foregoings, the light scattering type smoke detector comprises a smoke detecting means including a light emitting element and a light receiving element, a light emission controlling means connected to said light emitting element, a detected signal processing means connected to said light receiving element, and a housing for respective said means and including a labyrinth encircling at least said light receiving element for shielding the element from exterior light while allowing smoke to enter the interior, said labyrinth comprising a plurality of outer peripheral shielding elements defining between them a plurality of peripheral apertures, a plurality of inner shielding elements respectively disposed to oppose each of said peripheral apertures as spaced from said outer peripheral shielding elements and defining between adjacent ones of said inner shielding elements a plurality of inner apertures, and means made of perforated plate material for filtering other obstacles than smoke particles to allow substantially only said smoke particles to pass through said inner apertures. Therefore, the labyrinth can be widely opened to the exterior while being effectively shielded by the outer and inner wall elements spaced from each other with respect to the exterior light and by the filtering means disposed behind the outer wall elements with respect to such obstancles as dusts, insects or the like, so that smoke can be allowed to enter the interior more easily, whereby a higher sensitivity to smoke with a higher S/N ratio can be achieved, and the labyrinth can be made in a simpler structure resulting in reduced manufacturing costs. As the filtering means is made of perforated plate-shaped material, further, it is easier to prepare the means with uniform perforation attained, whereby the manufacturing costs can be also reduced while still achieving improved reliability of the detector.

What is claimed is:

1. A light scattering type smoke detector comprising a smoke detecting means including a light emitting element and a light receiving element, a light emission controlling means connected to said light emitting element, a detected signal processing means connected to said light receiving element, and a housing for respective said means and including a labyrinth encircling at least said light receiving element for shielding the element from exterior light while allowing smoke to enter the interior, said labyrinth comprising a plurality of outer peripheral shielding elements defining between them a plurality of peripheral apertures, a plurality of inner shielding elements respectively disposed to oppose each of said peripheral apertures as spaced from said outer peripheral shielding elements and defining between adjacent ones of said inner shielding elements a plurality of inner apertures, and means made of perforated plate material for filtering other obstacles than smoke particles to allow substantially only said smoke particles to pass through said inner apertures.

2. A light scattering type smoke detector according to claim 1 wherein said inner shielding elements and filtering means are formed integrally from a continuous strip-shaped plate material.

3. A light scattering type smoke detector according to claim 1 wherein said filtering means comprises a continuous strip-shaped plate material.

4. A light scattering type smoke detector according to claim 1 wherein said outer peripheral shielding elements are provided with an inward extended wall over a clearance by which said inner shielding elements are spaced from the outer shielding elements and abutting said filtering means.

5. A light scattering type smoke detector according to claim 4 wherein said labyrinth further comprises a plurality of inner wall elements respectively disposed to oppose each of said inner apertures as spaced therefrom inward, and said inner wall elements are respectively provided with an outward extended wall over a clearance by which the inner wall elements are spaced from the inner apertures.

6. A light scattering type smoke detector according to claim 4 wherein said inner shielding elements and filtering means are formed integrally from a continuous strip-shaped plate material, said labyrinth further comprises a plurality of inner wall elements respectively disposed to oppose each of said inner apertures as spaced therefrom inward and provided with an outward extended wall over a clearance by which the inner wall elements are spaced from the inner apertures, and a plurality of radially extending wall elements respectively disposed to oppose inside surface of each of said inner shielding elements.

7. A light scattering type smoke detector according to claim 4 wherein said filtering means comprises a continuous strip-shaped plate material, said labyrinth further comprises a plurality of inner wall elements respectively disposed to oppose each of said inner apertures as spaced therefrom inward and provided with an outward extended wall over a clearance by which the inner wall elements are spaced from the inner apertures, and a plurality of radially extending wall elements respectively disposed to oppose inside surface of each of said inner shielding elements through said continuous filtering means.

8. A light scattering type smoke detector according to claim 1 wherein said filtering means comprises a plurality of divided plates respectively perforated and disposed to close each of said inner apertures.

9. A light scattering type smoke detector according to claim 1 wherein said peripheral apertures are of a height substantially one half of that of said outer peripheral shielding elements, said filtering means comprises a continuous strip-shaped plate material which is perforated in one half region divided in lengthwise direction of said material, and the other half region non-perforated of the material forms said inner shielding elements.

10. A light scattering type smoke detector according to claim 4 wherein said filtering means comprises a plurality of divided plates respectively perforated along lengthwise edges remaining substantially middle part non-perforated, said lengthwise edges are engaged to respective inner edges of said inward extended walls of the outer shielding elements, and said non-perforated parts of said divided plates form said inner shielding elements.

* * * * *